US012651458B2

(12) United States Patent (10) Patent No.: US 12,651,458 B2
Osaki et al. (45) Date of Patent: Jun. 9, 2026

(54) DISPLAY CONTROL SYSTEM, DISPLAY CONTROL METHOD, AND RECORDING MEDIUM CONTAINING DISPLAY CONTROL PROGRAM

(71) Applicant: SHARP KABUSHIKI KAISHA, Sakai City (JP)

(72) Inventors: Yosuke Osaki, Sakai City (JP); Keiko Hirukawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 351 days.

(21) Appl. No.: 17/983,241

(22) Filed: Nov. 8, 2022

(65) Prior Publication Data

US 2023/0154190 A1 May 18, 2023

(30) Foreign Application Priority Data

Nov. 16, 2021 (JP) ................................. 2021-186098

(51) Int. Cl.
G06V 20/40 (2022.01)
G06T 11/00 (2026.01)

(52) U.S. Cl.
CPC .............. G06V 20/41 (2022.01); G06T 11/00 (2013.01); G06V 20/46 (2022.01)

(58) Field of Classification Search
CPC ......... G06V 20/41; G06V 20/46; G06T 11/00
USPC ......... 348/14.12, 14.03, 14.02, 14.08, 14.09, 348/14.1, 14.77, 14.78
See application file for complete search history.

(56) References Cited

U.S. PATENT DOCUMENTS

| | | | | |
|---|---|---|---|---|
| 2009/0079816 A1* | 3/2009 | Qvarfordt | .............. | G06V 40/20 |
| | | | | 348/14.16 |
| 2013/0147904 A1* | 6/2013 | Vivekanandan | .... | H04L 12/1827 |
| | | | | 348/E7.083 |
| 2020/0322575 A1* | 10/2020 | Valli | ...................... | G03B 21/00 |
| 2021/0382675 A1* | 12/2021 | Sharma | ................. | G06F 40/169 |

FOREIGN PATENT DOCUMENTS

| | | | | | |
|---|---|---|---|---|---|
| JP | 2010213133 A | * | 9/2010 | | |
| JP | 2010239393 A | * | 10/2010 | | |
| JP | 5423068 B2 | | 2/2014 | | |
| WO | WO-2019008320 A1 | * | 1/2019 | ......... | G06Q 10/1095 |

* cited by examiner

*Primary Examiner* — Duc Nguyen
*Assistant Examiner* — Carissa A Jones
(74) *Attorney, Agent, or Firm* — ScienBiziP, P.C.

(57) ABSTRACT

A display control system includes a meeting acquisition processor that acquires meeting information related to a meeting; a video image acquisition processor that acquires video image information corresponding to a video image capturing a user participating in the meeting; a determination processor that determines an image type of an image to be displayed on a meeting terminal on the basis of the meeting information acquired by the meeting acquisition processor; and an output processor that outputs an image corresponding to the video image information acquired by the video image acquisition processor and the image type determined by the determination processor, to the meeting terminal.

6 Claims, 16 Drawing Sheets

| | | | MEETING INFORMATION | | | | |
|---|---|---|---|---|---|---|---|
| MEETING DATE | MEETING TIME | MEETING ROOM ID | MEETING NAME | SUBSCRIBER ID | MEETING URL | PARTICIPANT | MEETING MATERIALS |
| 2021/11/10 | 10:30-11:00 | R0001 | M1 | ... | ... | ... | ... |
| 2021/11/10 | 16:30-17:00 | R0001 | M2 | ... | ... | ... | ... |
| 2021/11/11 | 18:00-19:00 | R0002 | M3 | ... | ... | ... | ... |
| ... | ... | ... | ... | ... | ... | ... | ... |

| IMAGE TYPE INFORMATION | |
|---|---|
| CONDITION | OUTPUT IMAGE |
| CONDITION 1 | IMAGE 1 (CAPTURED IMAGE) |
| CONDITION 2 | IMAGE 2 (PROCESSED IMAGE) |
| CONDITION 3 | IMAGE 3 (PROCESSED IMAGE) |
| CONDITION 4 | IMAGE 4 (PROCESSED IMAGE) |
| CONDITION 5 | IMAGE 5 (PROCESSED IMAGE) |

FIG. 9

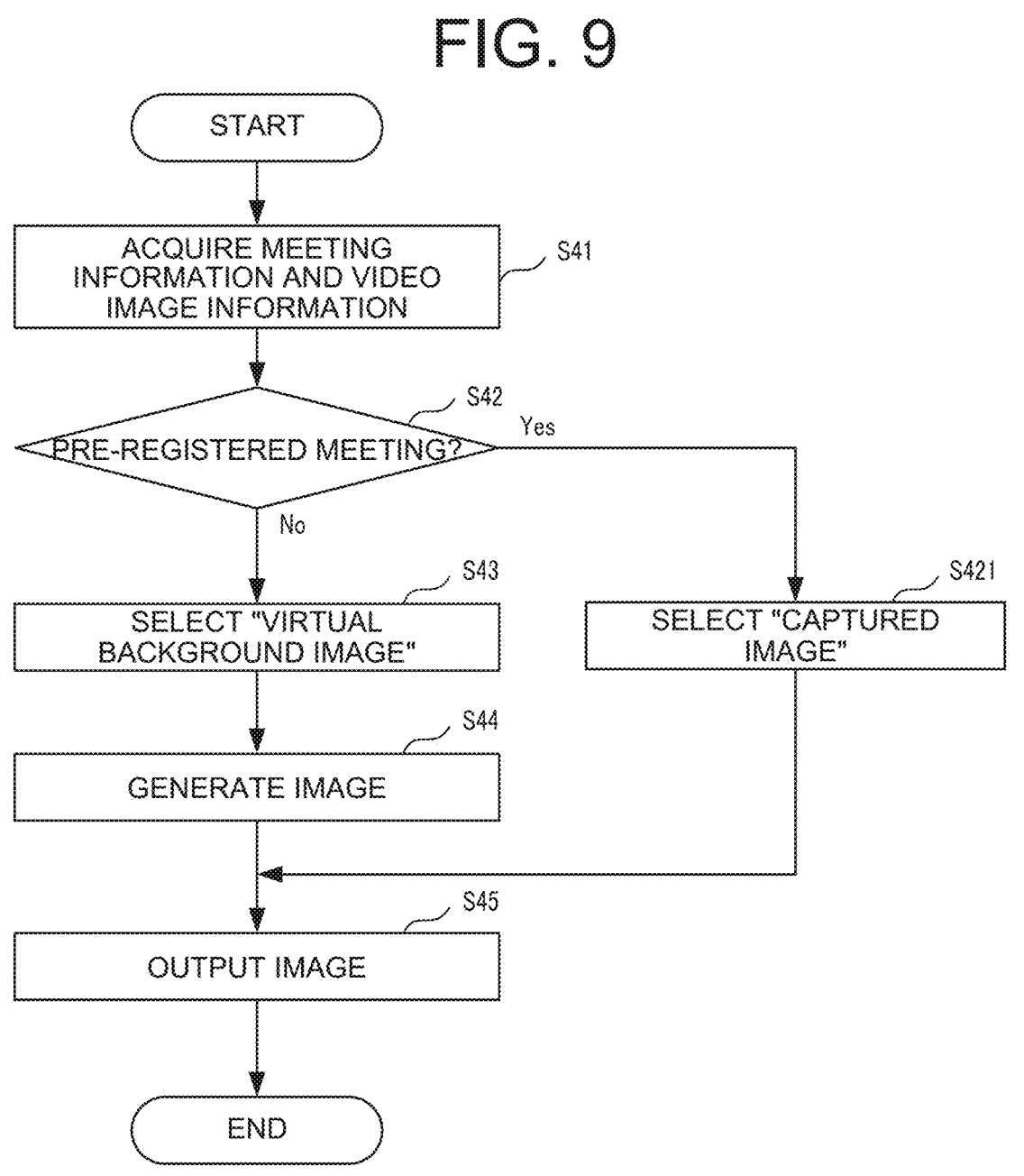

```
                    ┌──────────────┐
                    │    START     │
                    └──────┬───────┘
                           │
                           ▼
            ┌──────────────────────────────┐
            │   ACQUIRE MEETING            │─── S41
            │   INFORMATION AND VIDEO      │
            │   IMAGE INFORMATION          │
            └──────────────┬───────────────┘
                           │
                           ▼                         S42
                    ╱──────────────╲                      Yes
              ╱── PRE-REGISTERED MEETING? ──╲─────────────────┐
                    ╲──────────────╱                          │
                           │ No                               │
                           ▼          S43                     ▼        S421
            ┌──────────────────────┐         ┌──────────────────────────┐
            │  SELECT "VIRTUAL     │         │   SELECT "CAPTURED       │
            │  BACKGROUND IMAGE"   │         │   IMAGE"                 │
            └──────────┬───────────┘         └────────────┬─────────────┘
                       │         S44                       │
                       ▼                                   │
            ┌──────────────────────┐                       │
            │   GENERATE IMAGE     │                       │
            └──────────┬───────────┘◄──────────────────────┘
                       │         S45
                       ▼
            ┌──────────────────────┐
            │   OUTPUT IMAGE       │
            └──────────┬───────────┘
                       │
                       ▼
                ┌──────────────┐
                │     END      │
                └──────────────┘
```

FIG. 15

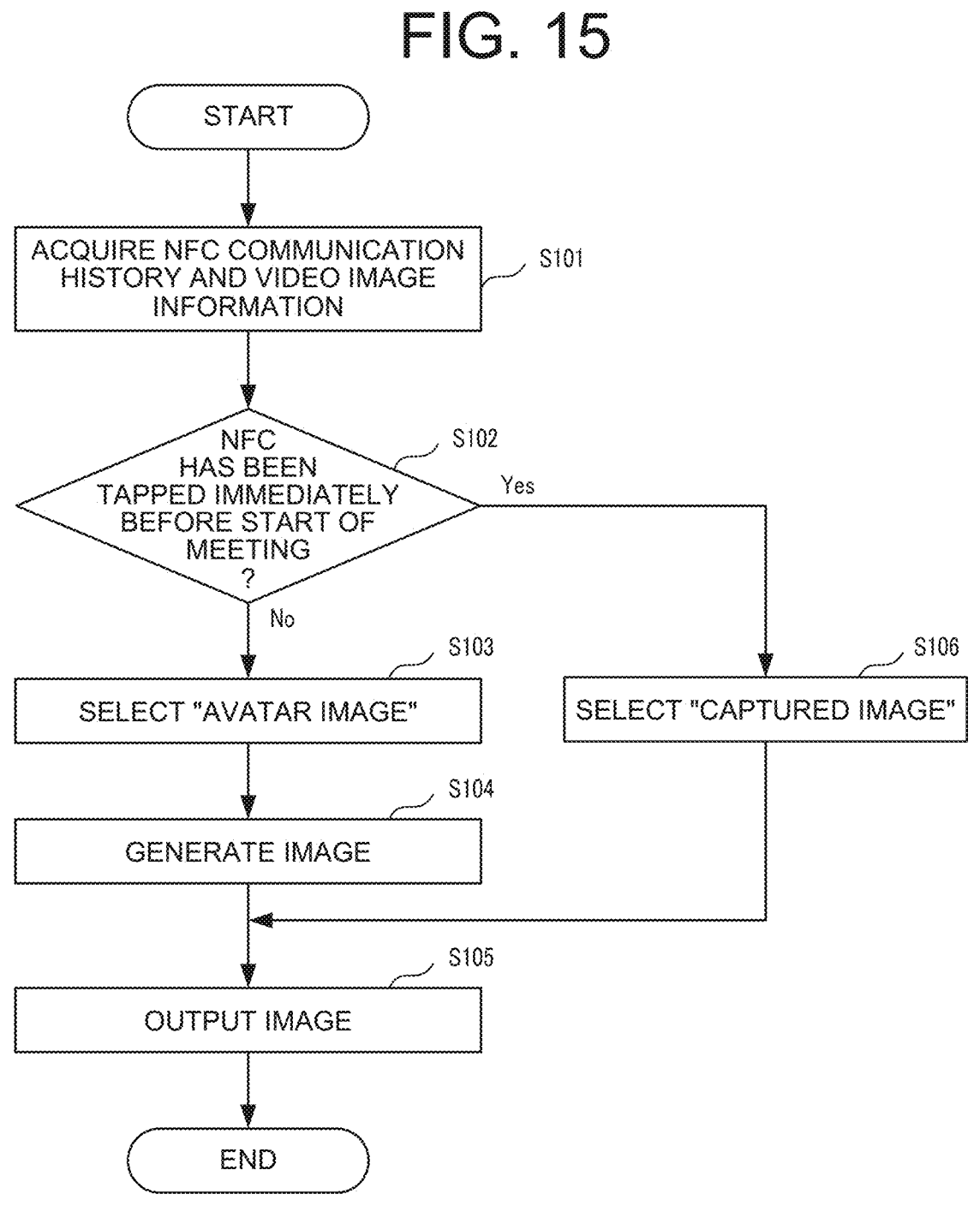

START

ACQUIRE NFC COMMUNICATION HISTORY AND VIDEO IMAGE INFORMATION — S101

NFC HAS BEEN TAPPED IMMEDIATELY BEFORE START OF MEETING ? — S102

No

Yes

SELECT "AVATAR IMAGE" — S103

SELECT "CAPTURED IMAGE" — S106

GENERATE IMAGE — S104

OUTPUT IMAGE — S105

END

DISPLAY CONTROL SYSTEM, DISPLAY CONTROL METHOD, AND RECORDING MEDIUM CONTAINING DISPLAY CONTROL PROGRAM

INCORPORATION BY REFERENCE

This application is based upon and claims the benefit of priority from the corresponding Japanese Patent Application No. 2021-186098 filed on Nov. 16, 2021, the entire contents of which are incorporated herein by reference.

BACKGROUND

The present disclosure relates to a display control system, a display control method, and a recording medium containing a display control program.

In recent years, a video meeting system (online meeting system) for holding a meeting in which voice, video images, files, and the like are transmitted/received at mutually separated places through a network, is used. For example, in the video meeting system, the face images of the participants of a meeting are displayed on each other's terminals (meeting terminals). In the conventional video meeting system, a technique has been proposed to switch between a captured image and a character image (avatar image) depending on the size of the display area and cause them to be displayed on the meeting terminal.

However, with the conventional technique, problems arise when character images are displayed in meetings where it is not appropriate to use character images, or when captured images are displayed in meetings where captured images are not desired. Thus, with the conventional technique, it is difficult to appropriately switch the displayed image in accordance with the content of the meeting.

SUMMARY

An object of the disclosure is to provide a display control system, a display control method, and a recording medium containing a display control program that can appropriately switch display images displayed on a meeting terminal in accordance with the content of a meeting.

A display control system according to an aspect of the disclosure causes an image to be displayed on a meeting terminal during a meeting in which a user participates, the image corresponding to the user, the system including a meeting acquisition processor that acquires meeting information related to the meeting; a video image acquisition processor that acquires video image information corresponding to a video image capturing the user participating in the meeting; a determination processor that determines an image type of the image to be displayed on the meeting terminal based on the meeting information acquired by the meeting acquisition processor; and an output processor that outputs an image corresponding to the video image information acquired by the video image acquisition processor and the image type determined by the determination processor, to the meeting terminal.

A display control method according to another aspect of the disclosure causes an image to be displayed on a meeting terminal during a meeting in which a user participates, the image corresponding to the user, the method executed by at least one processor acquiring meeting information related to the meeting; acquiring video image information corresponding to a video image capturing the user participating in the meeting; determining an image type of the image to be displayed on the meeting terminal based on the meeting information acquired by the step of acquiring meeting information; and outputting an image corresponding to the video image information acquired by the step of acquiring video image information and the image type determined by the step of determining, to the meeting terminal.

A recording medium according to another aspect of the disclosure contains a display control program that causes an image to be displayed on a meeting terminal during a meeting in which a user participates, the image corresponding to the user, the display control program causing at least one processor to execute: acquisition of meeting information related to the meeting; acquisition of video image information corresponding to a video image capturing the user participating in the meeting; determination of an image type of the image to be displayed on the meeting terminal based on the meeting information acquired by the acquisition of meeting information; and output of an image corresponding to the video image information acquired by the acquisition of video image information and the image type determined by the determination, to the meeting terminal.

The disclosure can provide a display control system, a display control method, and a recording medium containing a display control program that can appropriately switch display images displayed on a meeting terminal in accordance with the content of a meeting.

This Summary is provided to introduce a selection of concepts in a simplified form that is further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of meeting information according to an embodiment of the disclosure.

FIG. 4 is a diagram illustrating an example of image type information according to an embodiment of the disclosure.

FIG. 9 is a flowchart for explaining an example of a procedure of display control processing of an example 4 that is executed in the meeting system according to an embodiment of the disclosure.

FIG. 15 is a flowchart for explaining an example of a procedure of display control processing of an example 10 that is executed in the meeting system according to an embodiment of the disclosure.

DETAILED DESCRIPTION

Embodiments of the disclosure will now be described with reference to the accompanying drawings. Note that the following embodiments are mere examples that embody the disclosure, and are not intended to limit the technical scope of the disclosure.

A display control system according to the disclosure can be applied, for example, to a video meeting (online meeting) attended by multiple users at different locations (meeting rooms, office seats, homes, etc.). A meeting system according to the present embodiment is an example of the display control system of the disclosure. The meeting system according to the present embodiment, user terminals used by users participating during a meeting are disposed in, for example, each meeting room.
Meeting System 100

Figure 1:
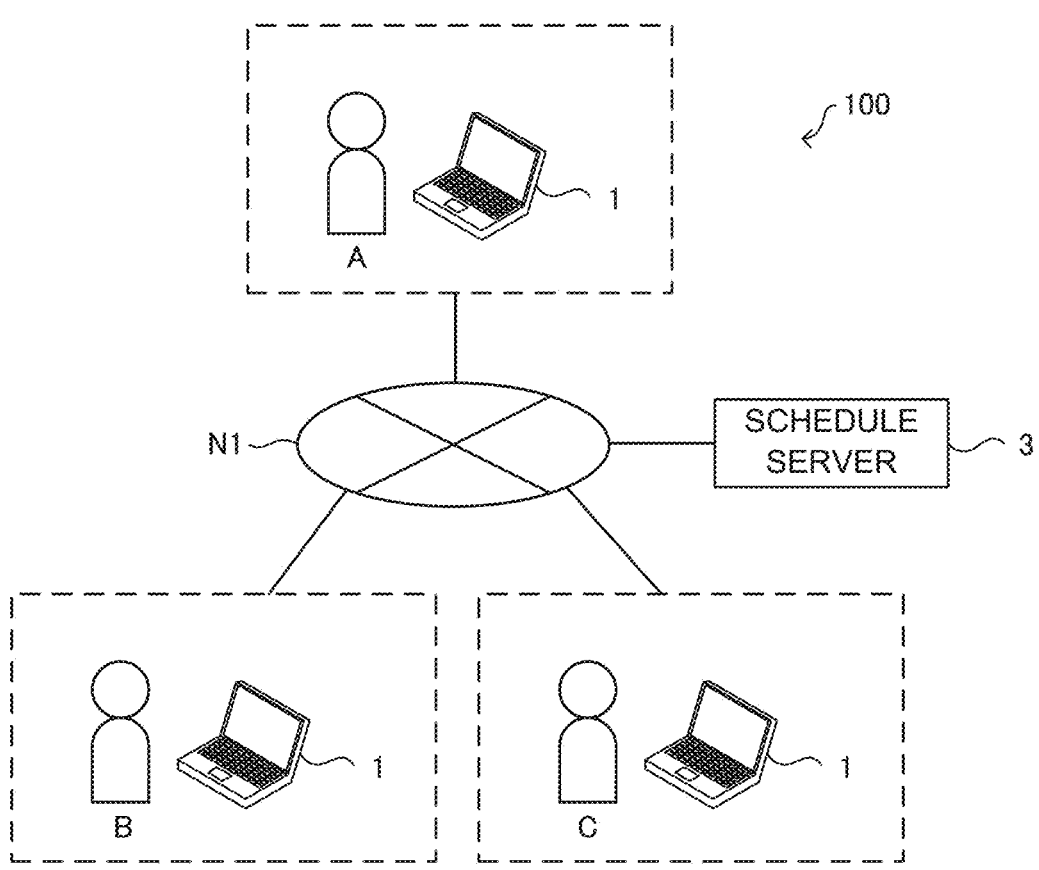
FIG. 1 is a schematic diagram illustrating the schematic configuration of a meeting system according to an embodiment of the disclosure.

FIG. 1 is a diagram illustrating the schematic configuration of the meeting system 100 according to an embodiment of the disclosure. The meeting system 100 includes user terminals 1, camera devices 2 (see FIG. 2), and a schedule server 3. The meeting system 100 is a system that supports meetings attended by multiple users. The meeting system 100 causes images corresponding to the user to be displayed on a meeting terminal (e.g., a user terminal 1) during a meeting attended by the user.

FIG. 1 illustrates three different locations. Here is an example of a video meeting attended by users A, B, and C using user terminals 1 at different locations. Each user terminal 1 executes a meeting application installed in the user terminal and sends and receives camera images and audio to and from the other user terminals 1 to conduct video meeting with other user terminals 1. At each location, a microphone-speaker device, a camera device, etc., are connected to the user terminal 1 to enable bidirectional communication of voice and camera images. The microphone-speaker device and the camera device may be built into the user terminal 1.

The schedule server 3 manages meeting information D1 related to meeting schedules (reservations).

FIG. 3 is a table illustrating an example of the meeting information D1. In the meeting information D1, meeting reservation information in which the meeting date, the meeting time, the meeting room ID, the meeting name, the subscriber IDs, the meeting URL, the participants, the meeting materials, and the like are associated with each other for each meeting is registered. The meeting room ID is identification information of a meeting room where a meeting is held. The subscriber ID is identification information that identifies a user who reserves a meeting. The meeting URL is access information (connection information) for connecting when a meeting is started. For example, the controller 11 accesses the meeting URL so as to start a meeting application (a general-purpose meeting application) corresponding to the meeting URL and to connect to a destination ID (meeting ID). The meeting materials are the materials used for the meeting. For example, when a meeting is determined to be held, a subscriber operates their own PC (e.g., the user terminal 1) to execute a reservation operation of inputting meeting information including each of the aforementioned pieces of information. The controller 11 accesses and registers the meeting reservation information in response to the reservation operation by the subscriber to the meeting information D1 on the schedule server 3.

The schedule server 3 manages the meeting information D1 for each user. For example, the schedule server 3 associates the meeting information D1 with a user ID (e.g., login ID) and registers the meeting information D1.

In addition to the meeting information D1, the schedule server 3 may also manage action schedule information, attendance information, and the like for each user. The above-mentioned action schedule information includes information on planned outings, etc. The attendance information includes information such as working hours, work location (in-house, home, etc.), and vacation schedule.

A known server (e.g., cloud server) that provides scheduling services can be used as the schedule server 3 in the present embodiment.
User Terminal 1

Figure 2:
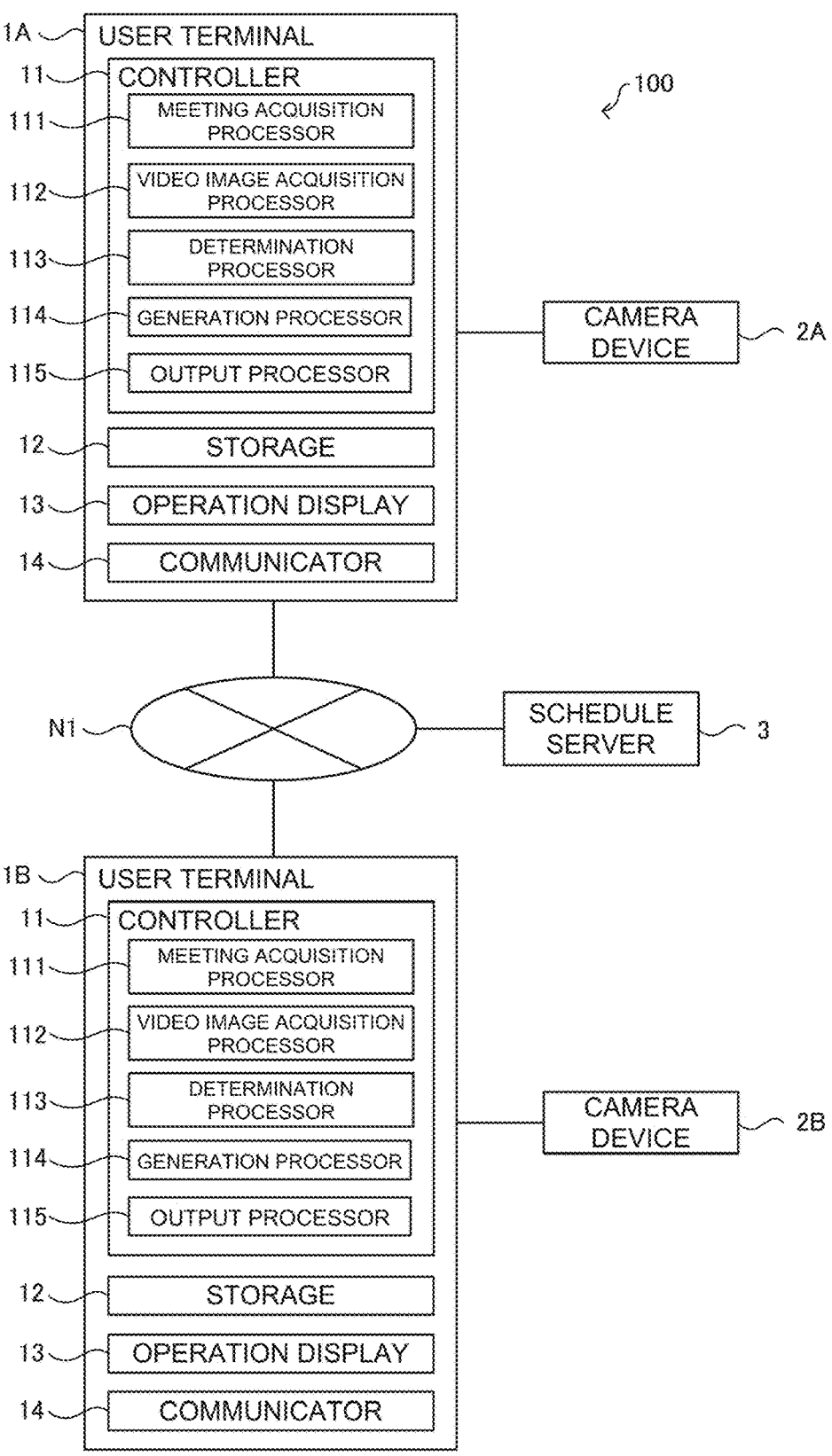
FIG. 2 is a functional block diagram illustrating the configuration of a meeting system according to an embodiment of the disclosure.

As illustrated in FIG. 2, the user terminal 1 includes a controller 11, a storage 12, an operation display 13, a communicator 14, and the like. The user terminal 1 is an information processing device such as a personal computer (PC), a smartphone, a tablet terminal. The user terminal 1 is an example of a meeting terminal of the present disclosure. Each user terminal 1 has the same configuration.

The communicator 14 is a communicator which connects the user terminal 1 to a network N1 in a wired or wireless manner and executes data communication according to a predetermined communication protocol with other devices, such as other user terminals 1, other camera devices 2, the schedule server 3, and so on via the network N1. The user terminal 1 may be connected to meeting equipment (a display, a microphone-speaker device, and the like) via the communicator 14 by a wired LAN or a wireless LAN.

The operation display 13 is a user interface including: a display, such as a liquid crystal display and an organic EL display, which displays various kinds of information; and an operation acceptor, such as a mouse, a keyboard, and a touch panel, which receives an operation. The operation display 13 accepts, for example, operations of the user of the user terminal 1.

The storage 12 is a non-volatile storage including a hard disk drive (HDD), a solid state drive (SSD), and a flash memory that stores various types of information. The storage 12 stores a control program, such as a display control program for causing the controller 11 to execute a display control process (refer to FIG. 6), which will be described below. For example, the display control program is temporarily recorded in a computer-readable recording medium such as a CD or a DVD, read by a reading device (not shown) such as a CD drive or a DVD drive included in the user terminal 1, and stored in the storage 12. Note that the display control program may be distributed from a cloud server and stored in the storage 12.

The storage 12 stores image type information D2, which is information on the image type of the image to be displayed on user terminal 1. FIG. 4 illustrates an example of the image type information D2. In the image type information D2, the output image type according to conditions is registered. The conditions include conditions related to each piece of information contained in the meeting information D1 (see FIG. 3), the type of meeting application used for the meeting, the type of microphone-speaker device used for the meeting, the communication means for connecting to the meeting (e.g., Wi-Fi). The output image includes a captured image, which is a video image of the user captured by the camera device 2, and a processed image, which is a processed video image of the user captured by the camera device 2. The processed image includes a character image (also referred to as an avatar image) an illustration image, a digital human image, and a virtual background image. For example, images 1 to 5 in FIG. 4 are each an avatar image, an illustration image, a digital human image, a virtual background image, or a 3D avatar image.

For example, the controller 11 of the user terminal 1A of a user A refers to the image type information D2 to determine type of image that satisfies the conditions related to the meeting information D1 and is to be displayed on user terminal 1B of a user B. Specific examples of the method of determining the image type are described below.

The controller 11 includes control devices, such as a CPU, a ROM, and a RAM. The CPU is a processor that executes various types of arithmetic processing. The ROM stores in advance control programs such as a BIOS and an OS for causing the CPU to execute various types of processing. The RAM stores various types of information and is used as a temporary storage memory (work area) for the various types of processing executed by the CPU. The controller 11 then controls the user terminal 1 by causing the CPU to execute various types of control programs stored in advance in the ROM or the storage 12.

Specifically, the controller 11 includes various types of processors, such as a meeting acquisition processor 111, a video image acquisition processor 112, a determination processor 113, a generation processor 114, and an output processor 115. The controller 11 functions as the various types of processors by executing the various types of processing according to the display control program. Some or all of the processors included in the controller 11 may be configured by an electronic circuit. The display control program may cause a plurality of processor devices to function as the various processors.

The meeting acquisition processor 111 acquires the meeting information D1 (see FIG. 3). For example, when the user A performs a login operation at a user terminal 1A, the meeting acquisition processor 111 accesses the schedule server 3 to acquire the meeting information D1 associated with the user ID of the user A.

The video image acquisition processor 112 acquires video image information corresponding to the video image capturing the users participating in the meeting. Here, each user terminal 1 is individually connected to a camera device 2. For example, a camera device 2A is connected to the user terminal 1A, and a camera device 2B is connected to a user terminal 1B (see FIG. 2). The camera device 2A captures the user A using the user terminal 1A, and the camera device 2B captures the user B using the user terminal 1B. Each camera device 2 may be built into the corresponding user terminal 1.

The camera device 2 may be a device that outputs the captured video image (captured image) to the user terminal 1, or it may be a device (e.g., a smartphone) that extracts the feature values of the user's face on the basis of the captured video image and outputs the extracted feature value data to the user terminal 1. A single user terminal 1 may be connected to multiple camera devices 2. In such a case, the captured image and the feature value data may be input to the user terminal 1.

The video image acquisition processor 112 acquires video image information (captured images and feature value data) from the camera device 2 at the start of a meeting, during a meeting, etc. That is, the video image acquisition processor 112 acquires captured image that is a video image of the user captured with the camera device 2 or feature value data extracted from the video image of the user captured by the camera device 2.

The determination processor 113 determines the image type of the image to be displayed on the other user terminals 1 on the basis of the meeting information D1 acquired by the meeting acquisition processor 111. Specifically, the determination processor 113 refers to the image type information D2 (see FIG. 4) to determine the image type that satisfies the conditions related to the meeting information D1 (see FIG. 3). For example, the determination processor 113 determines the image type on the basis of at least one of the following information contained in the meeting information D1: the meeting time, the meeting participants, the content of the meeting, the importance of the meeting, and the location of the users participating in the meeting.

The determination processor 113 determines the image type on the basis of at least one of the following information: the type of meeting application used for the meeting, the type of microphone-speaker device used for the meeting, and the communicator for connecting to the meeting.

The determination processor 113 determines, as the image type, a captured image that is a processed video image of the user captured with the camera device 2 or a processed image that is a processed image of a user captured with the camera device 2, on the basis of the meeting information D1. The processed image includes at least one of a character image, an illustration image, a digital human image, and a virtual background image.

For example, if the meeting attended by the user A is a meeting attended by members outside the company, the determination processor 113 determines "captured image" as the image type. For example, if the meeting attended by the user A is a meeting held outside of working hours, the determination processor 113 determines "processed image (e.g., avatar image)" as the image type.

The generation processor 114 generates the processed image from the video image information acquired by the video image acquisition processor 112. Specifically, the generation processor 114 generates the processed image in accordance with the image type determined by the determination processor 113 for the video image information acquired by the video image acquisition processor 112. For example, the generation processor 114 generates a character image (avatar image), an illustration image, a digital human image, a virtual background image, etc., on the basis of the image captured by the camera device 2. The method of generating the processed image from the captured image can adopt known techniques.

The output processor 115 outputs the video image information acquired by the video image acquisition processor 112 and an image corresponding to the image type determined by the determination processor 113 to another user terminal 1. For example, if the meeting attended by the user A is a meeting attended by members outside the company, the output processor 115 of the user terminal 1A outputs a captured image of the user A to the user terminal 1B. In such a case, user terminal 1B causes the image capturing the user A to be displayed on its own operation display 13.

For example, if the meeting attended by the user A is a meeting held outside of working hours, the output processor 115 of the user terminal 1A outputs an avatar image of the user A to the user terminal 1B. In such a case, user terminal 1B causes the avatar image of the user A to be displayed on its own operation display 13.

Figure 5:
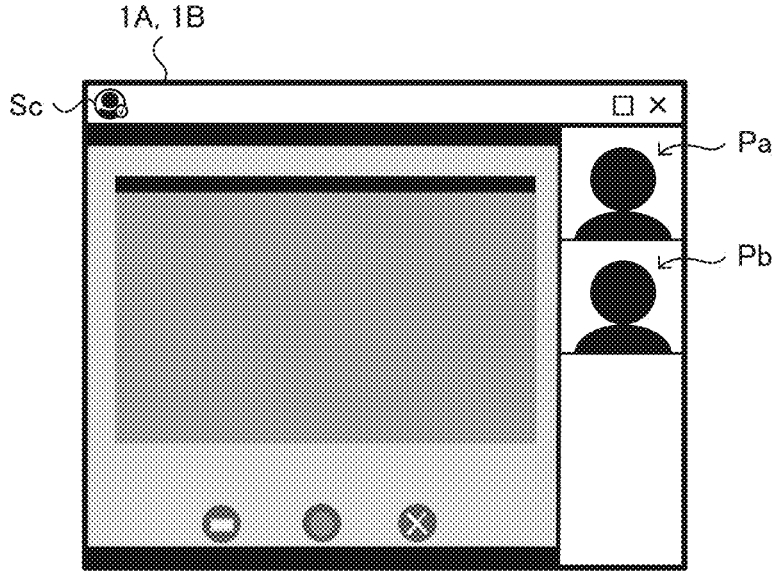
FIG. 5 is a diagram illustrating an example of a meeting application screen displayed on a user terminal according to an embodiment of the disclosure.

The user terminals 1A and 1B both execute the same process to cause an image Pa of the user A and an image Pb of the user B to be displayed on the user terminals 1A and 1B, respectively, as illustrated in the meeting application screen in FIG. 5. An icon image Sc of the login user may be displayed on the meeting application screen in FIG. 5. The icon image Sc may alternatively be an image representing the user's status (e.g., on vacation, commuting, working remotely, etc.).

The controller 11 performs a meeting process in addition to the above-described processes. Specifically, the controller 11 starts the meeting application and connects to another user terminal 1. Once each user terminal 1 is connected, the controller 11 starts the meeting by sending and receiving audio, video image, files, and the like. The controller 11 causes the meeting application screen to be displayed (see FIG. 5).

The controller 11 accepts various operations (meeting start operation, meeting end operation, screen sharing operation, etc.) by the user on the meeting application screen.
Display Control Process An example of a procedure of the display control process executed by the meeting system 100 will now be described below with reference to FIGS. 6 to 17. Each of the flowcharts in FIGS. 6 to 17 illustrates a specific example of the display control process. The display control process executed by the user terminal 1A used by the user A will now be described. Specifically, the controller 11 of the user terminal 1A determines the type of image to be displayed on the user terminal 1B on the basis of specific information such as meeting information, and executes a process of outputting an image of the determined type to the user terminal 1B.

The disclosure can be regarded as a disclosure of a display control method (an example of a display control method of the disclosure) in which one or more steps included in the display control process are executed. The one or more steps included in the display control process described herein may be omitted as appropriate. The order of execution of each step in the display control process may be different to the extent that the same effect is produced.

In the example described here, the controller 11 of the user terminal 1 executes each step in the display control process; however, according to another embodiment, one or more processors may decentrally execute each step in the display control process.

Example 1

Figure 6:
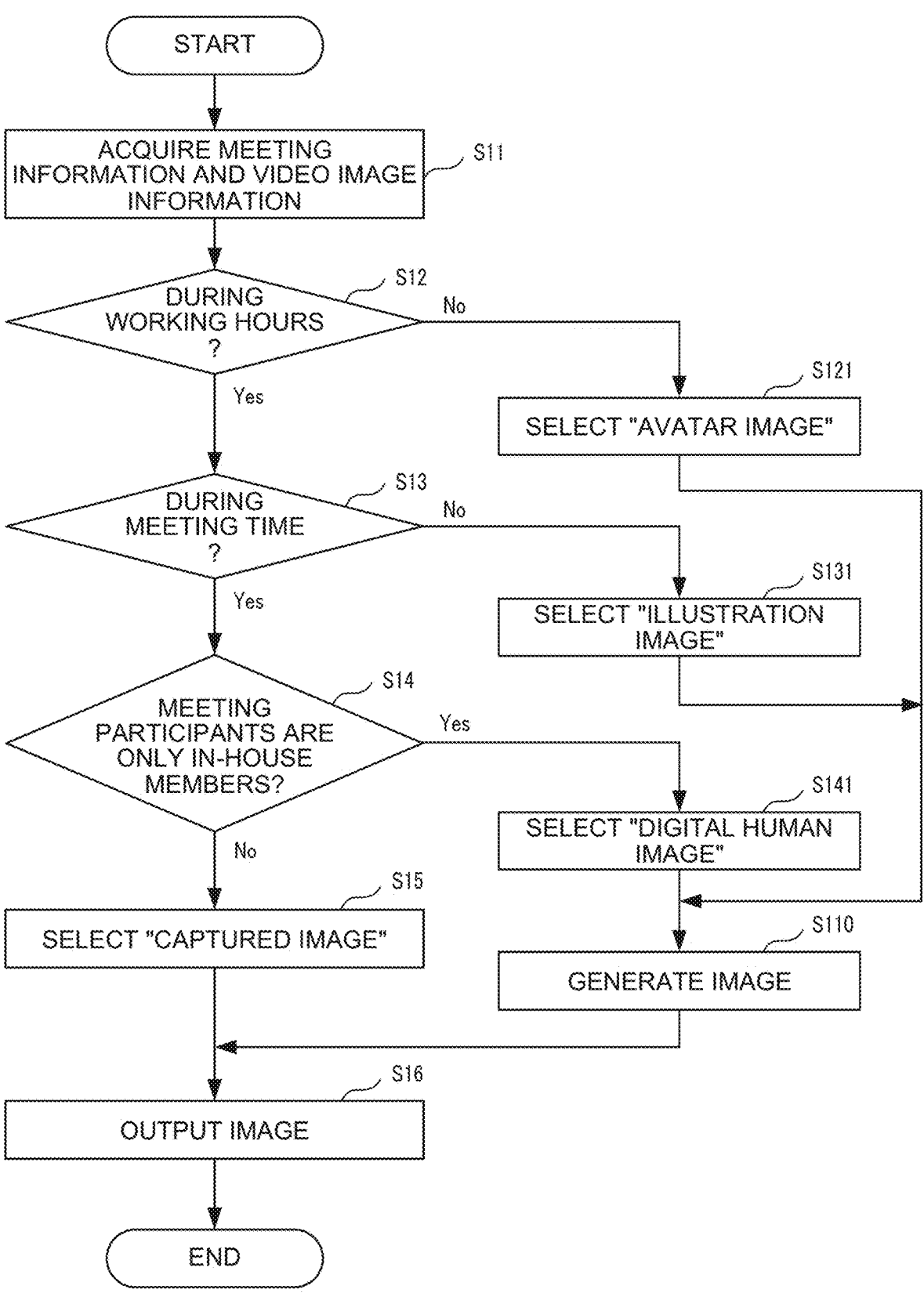
FIG. 6 is a flowchart for explaining an example of a procedure of display control processing of an example 1 that is executed in the meeting system according to an embodiment of the disclosure.

FIG. 6 is a flowchart corresponding to the display control process according to Example 1.

In step S11, the controller 11 acquires the meeting information and video image information. Specifically, when the user A performs the login operation, the controller 11 acquires the meeting information D1 corresponding to the user A (see FIG. 3) from the schedule server 3. When the user A performs the login operation, the controller 11 acquires the video image information (e.g., captured images) from the camera device 2A.

In step S12, the controller 11 determines whether or not the current time is within the working hours of the user A. The working hours may be working hours specific to the user A or shared working hours defined within the company to which the user A belongs. If the current time is within the working hours of the user A (S12: Yes), the controller 11 causes the process to proceed to step S13. If the current time is not within the working hours of the user A (S12: No), the controller 11 causes the process to proceed to step S121.

In step S121, the controller 11 determines that the type of the image to be displayed on the user terminal 1B is an "avatar image (character image)." After step S121, the controller 11 causes the process to proceed to step S110.

In step S13, the controller 11 determines whether or not the current time is within the meeting time of the meeting attended by the user A. If the current time is within the meeting time of the user A (S13: Yes), the controller 11 causes the process to proceed to step S14. If the current time is not within the meeting time of the user A (S13: No), the controller 11 causes the process to proceed to step S131.

In step S131, the controller 11 determines that the type of the image to be displayed on the user terminal 1B is an "illustration image." After step S131, the controller 11 causes the process to proceed to step S110.

In step S14, the controller 11 determines whether or not the meeting participants are only members of the company. If the meeting participants only in-house members (S14: Yes), the controller 11 causes the process to proceed to step S141. If the meeting participants are not only in-house members, i.e., the meeting participants include members outside the company (S14: No), the controller 11 causes the process to proceed to step S15.

In step S141, the controller 11 determines that the type of the image to be displayed on the user terminal 1B is a "digital human image." After step S141, the controller 11 causes the process to proceed to step S110.

In step S15, the controller 11 determines that the type of the image to be displayed on the user terminal 1B is a "captured image." After step S15, the controller 11 causes the process to proceed to step S16.

In step S110, the controller 11 generates an image of the determined type. Here, the controller 11 generates an avatar image, an illustration image, or a digital human image based on the captured image. After step S110, the controller 11 causes the process to proceed to step S16.

In step S16, the controller 11 outputs the image of the determined type to the user terminal 1B. Here, the controller 11 outputs a captured image, an avatar image, an illustration image, or a digital human image to the user terminal 1B. Upon acquiring the image from user terminal 1A, the user terminal 1B causes the acquired image to be displayed on the meeting application screen (see FIG. 5).

Example 2

Figure 7:
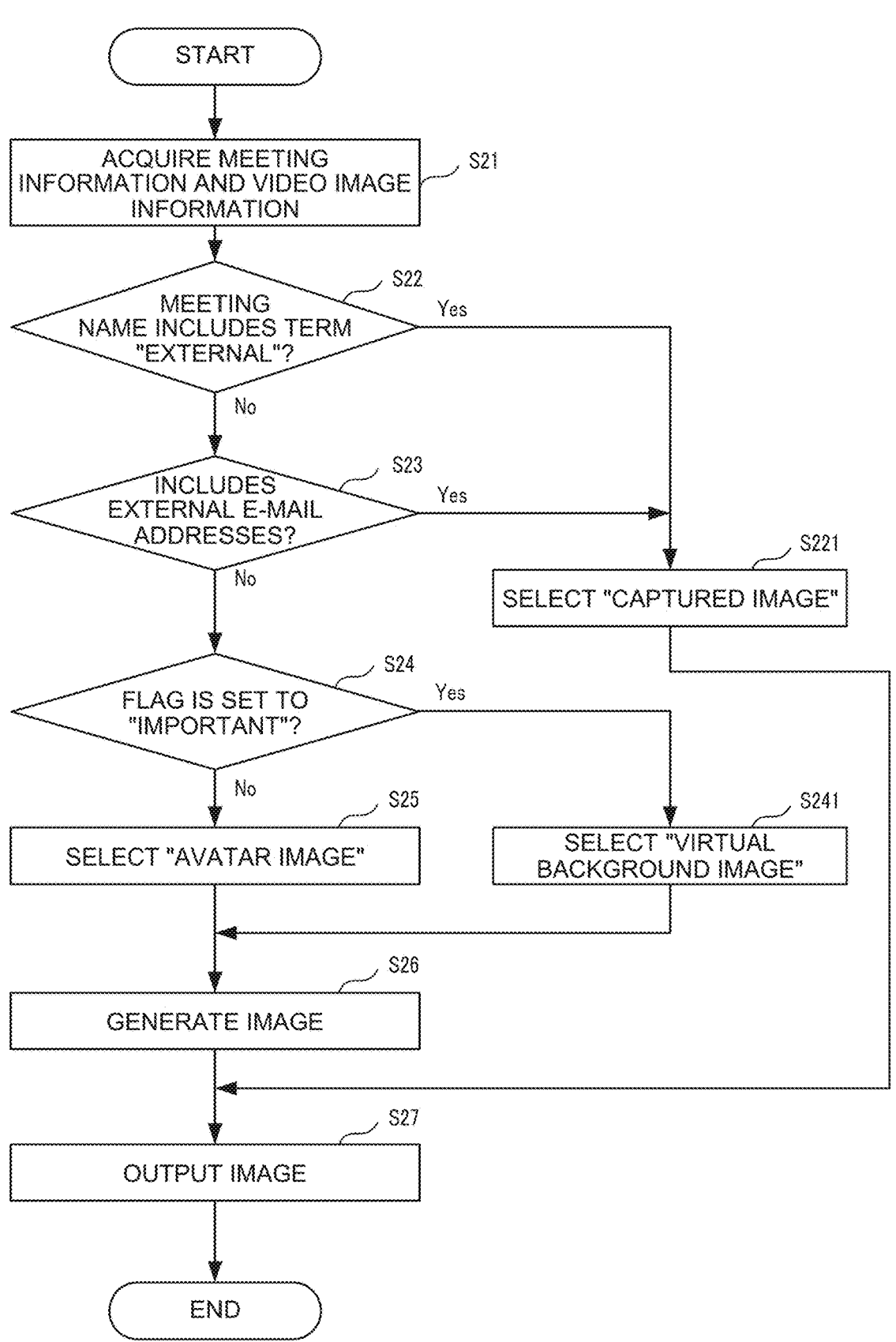
FIG. 7 is a flowchart for explaining an example of a procedure of display control processing of an example 2 that is executed in the meeting system according to an embodiment of the disclosure.

FIG. 7 is a flowchart corresponding to the display control process according to Example 2.

In step S21, the controller 11 acquires the meeting information and video image information. Specifically, when the user A performs the login operation, the controller 11 acquires the meeting information D1 corresponding to the user A (see FIG. 3) from the schedule server 3. When the user A performs the login operation, the controller 11 acquires the video image information (e.g., captured images) from the camera device 2A.

In step S22, the controller 11 determines whether or not the term "external" is included in the meeting name (title). If the meeting name includes the term "external" (S22: Yes), the controller 11 causes the process to proceed to step S221. If the meeting name does not include the term "external" (S22: No), the controller 11 causes the process to proceed to step S23.

In step S221, the controller 11 determines that the type of the image to be displayed on the user terminal 1B is a "captured image." After step S221, the controller 11 causes the process to proceed to step S27.

In step S23, the controller 11 determines whether or not an external email address is included in the meeting information D1. If the meeting information D1 includes an external email address (S23: Yes), the controller 11 causes the process to proceed to step S221. If the meeting information D1 does not include an external email address (S23: No), the controller 11 causes the process to proceed to step S24.

In step S24, the controller 11 determines whether or not a meeting flag is set to "important." If the meeting flag is set to "important" (S24: Yes), the controller 11 causes the process to proceed to step S241. If the meeting flag is not set to "important" (S24: No), the controller 11 causes the process to proceed to step S25.

In step S241, the controller 11 determines that the type of the image to be displayed on the user terminal 1B is a "virtual background image." After step S241, the controller 11 causes the process to proceed to step S26.

In step S25, the controller 11 determines that the type of the image to be displayed on the user terminal 1B is an "avatar image." After step S25, the controller 11 causes the process to proceed to step S26.

In step S26, the controller 11 generates an image of the determined type. Here, the controller 11 generates a virtual background image or an avatar image based on the captured image. After step S26, the controller 11 causes the process to proceed to step S27.

In step S27, the controller 11 outputs the image of the determined type to the user terminal 1B. Here, the controller 11 outputs a captured image, a virtual background image, or an avatar image to the user terminal 1B. Upon acquiring the image from user terminal 1A, the user terminal 1B causes the acquired image to be displayed on the meeting application screen (see FIG. 5).

Example 3

Figure 8:
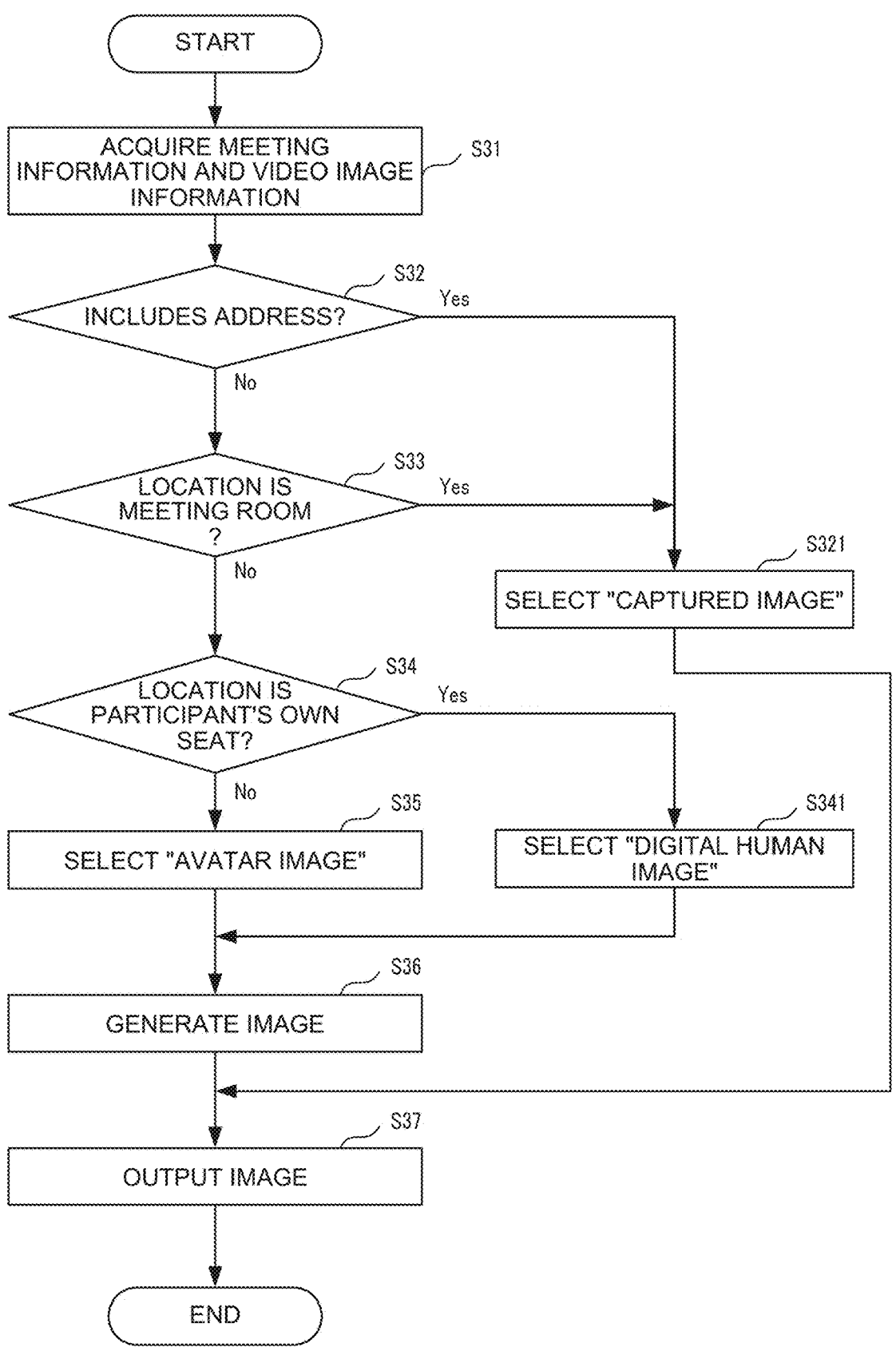
FIG. 8 is a flowchart for explaining an example of a procedure of display control processing of an example 3 that is executed in the meeting system according to an embodiment of the disclosure.

FIG. 8 is a flowchart corresponding to the display control process according to Example 3.

In step S31, the controller 11 acquires the meeting information and video image information. Specifically, when the user A performs the login operation, the controller 11 acquires the meeting information D1 corresponding to the user A (see FIG. 3) from the schedule server 3. When the user A performs the login operation, the controller 11 acquires the video image information (e.g., captured images) from the camera device 2A.

In step S32, the controller 11 determines whether or not address information is included in the meeting information D1. If the meeting information D1 includes address information (S32: Yes), the controller 11 causes the process to proceed to step S321. If the meeting information D1 does not include address information (S32: No), the controller 11 causes the process to proceed to step S33.

In step S321, the controller 11 determines that the type of the image to be displayed on the user terminal 1B is a "captured image." After step S321, the controller 11 causes the process to proceed to step S37.

In step S33, the controller 11 determines whether or not the location corresponding to the address information is a meeting room. If the location corresponding to the address information is a meeting room (S33: Yes), the controller 11 causes the process to proceed to step S321. If the location corresponding to the address information is not a meeting room (S33: No), the controller 11 causes the process to proceed to step S34.

In step S34, the controller 11 determines whether or not the location corresponding to the address information is the user's seat. If the location corresponding to the address information is the user's seat (S34: Yes), the controller 11 causes the process to proceed to step S341. If the location corresponding to the address information is not the user's seat (S34: No), the controller 11 causes the process to proceed to step S35.

In step S341, the controller 11 determines that the type of the image to be displayed on the user terminal 1B is a "digital human image." After step S341, the controller 11 causes the process to proceed to step S36.

In step S35, the controller 11 determines that the type of the image to be displayed on the user terminal 1B is an "avatar image." After step S35, the controller 11 causes the process to proceed to step S36.

In step S36, the controller 11 generates an image of the determined type. Here, the controller 11 generates a digital human image or an avatar image based on the captured image. After step S36, the controller 11 causes the process to proceed to step S37.

In step S37, the controller 11 outputs the image of the determined type to the user terminal 1B. Here, the controller 11 outputs a captured image, a digital human image, or an avatar image to the user terminal 1B.

Upon acquiring the image from user terminal 1A, the user terminal 1B causes the acquired image to be displayed on the meeting application screen (see FIG. 5).

Example 4

FIG. 9 is a flowchart corresponding to the display control process according to Example 4.

In step S41, the controller 11 acquires the meeting information and video image information. Specifically, when the user A performs the login operation, the controller 11 acquires the meeting information D1 corresponding to the user A (see FIG. 3) from the schedule server 3. When the user A performs the login operation, the controller 11 acquires the video image information (e.g., captured images) from the camera device 2A.

In step S42, the controller 11 determines whether or not the meeting to be started is a meeting pre-registered to the meeting information D1. If the meeting to be stated is a meeting pre-registered to the meeting information D1 (S42: Yes), the controller 11 causes the process to proceed to step S421. If the meeting to be stated is not a meeting pre-registered to the meeting information D1 (S42:No), the controller 11 causes the process to proceed to step S43.

In step S421, the controller 11 determines that the type of the image to be displayed on the user terminal 1B is a "captured image." After step S421, the controller 11 causes the process to proceed to step S45.

In step S43, the controller 11 determines that the type of the image to be displayed on the user terminal 1B is a "virtual background image." After step S43, the controller 11 causes the process to proceed to step S44.

In step S44, the controller 11 generates an image of the determined type. Here, the controller 11 generates a virtual background image based on the captured image. After step S44, the controller 11 causes the process to proceed to step S45.

In step S45, the controller 11 outputs the image of the determined type to the user terminal 1B. Here, the controller 11 outputs a captured image or a virtual background image to the user terminal 1B. Upon acquiring the image from user terminal 1A, the user terminal 1B causes the acquired image to be displayed on the meeting application screen (see FIG. 5).

Example 5

Figure 10:
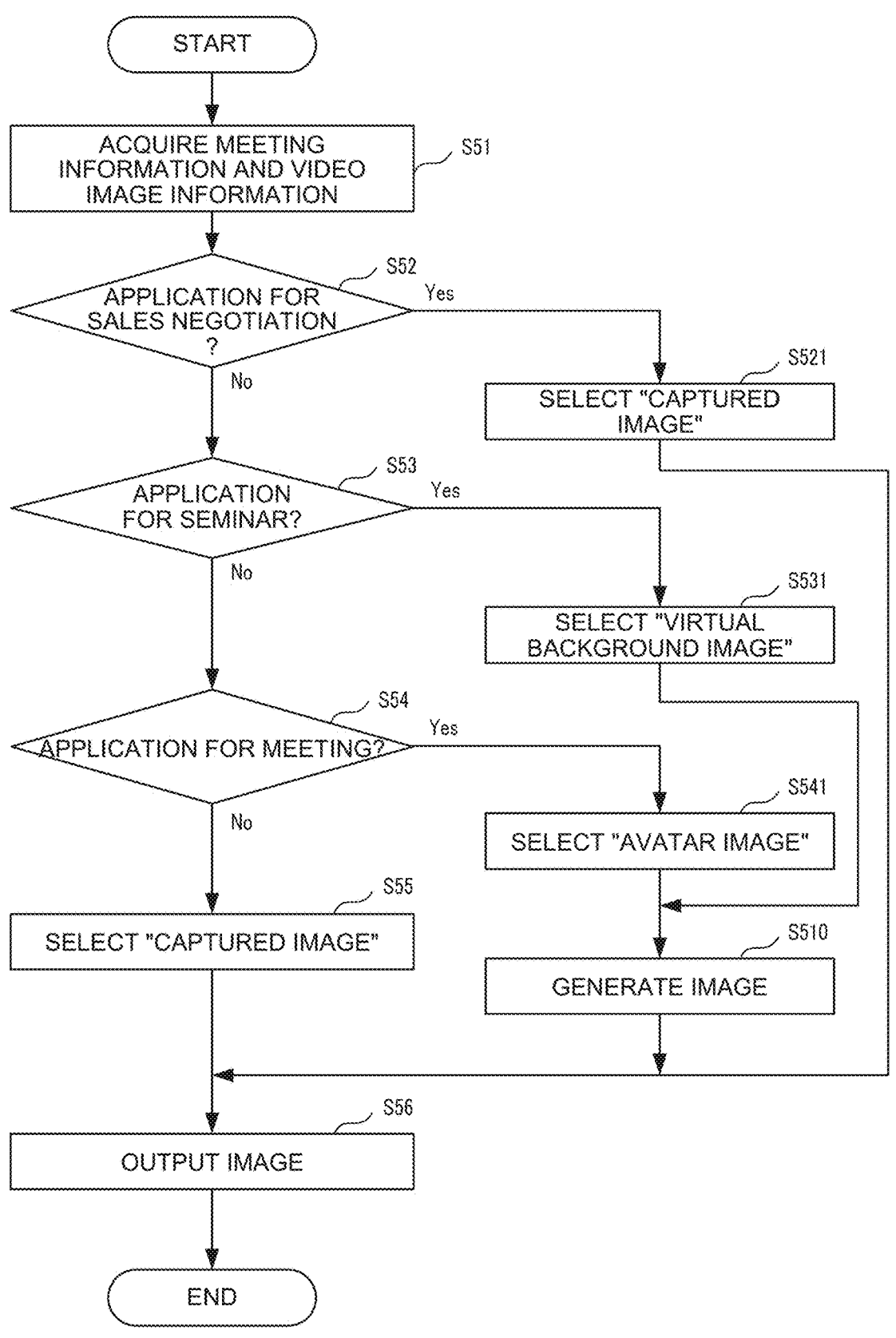
FIG. 10 is a flowchart for explaining an example of a procedure of display control processing of an example 5 that is executed in the meeting system according to an embodiment of the disclosure.

FIG. 10 is a flowchart corresponding to the display control process according to Example 5.

In step S51, the controller 11 acquires the meeting information and video image information. Specifically, when the user A performs the login operation, the controller 11 acquires the meeting information D1 corresponding to the user A (see FIG. 3) from the schedule server 3. When the user A performs the login operation, the controller 11 acquires the video image information (e.g., captured images) from the camera device 2A.

In step S52, the controller 11 determines whether or not the application used for video meeting is an application for sales negotiations. If the application used for video meeting is an application for sales negotiations (S52:Yes), the controller 11 causes the process to proceed to step S521. If the application used for video meeting is not an application for sales negotiations (S52:No), the controller 11 causes the process to proceed to step S53.

In step S521, the controller 11 determines that the type of the image to be displayed on the user terminal 1B is a "captured image." After step S521, the controller 11 causes the process to proceed to step S56.

In step S53, the controller 11 determines whether or not the application used for video meeting is an application for seminars. If the application used for video meeting is an application for seminars (S53: Yes), the controller 11 causes the process to proceed to step S531. If the application used for video meeting is not an application for seminars (S53: No), the controller 11 causes the process to proceed to step S54.

In step S531, the controller 11 determines that the type of the image to be displayed on the user terminal 1B is a "virtual background image." After step S531, the controller 11 causes the process to proceed to step S510.

In step S54, the controller 11 determines whether or not the application used for video meeting is an application for meetings. If the application used for video meeting is an application for meetings (S54:Yes), the controller 11 causes the process to proceed to step S541. If the application used for video meeting is not an application for meetings (S54: No), the controller 11 causes the process to proceed to step S55.

In step S541, the controller 11 determines that the type of the image to be displayed on the user terminal 1B is an "avatar image." After step S541, the controller 11 causes the process to proceed to step S510.

In step S55, the controller 11 determines that the type of the image to be displayed on the user terminal 1B is a "captured image." After Step S55, the controller 11 causes the process to proceed to step S56.

In step S510, the controller 11 generates an image of the determined type. Here, the controller 11 generates a virtual background image or an avatar image based on the captured image. After Step S510, the controller 11 causes the process to proceed to step S56.

In step S56, the controller 11 outputs the image of the determined type to the user terminal 1B. Here, the controller 11 outputs a captured image, a virtual background image, or an avatar image to the user terminal 1B. Upon acquiring the image from user terminal 1A, the user terminal 1B causes the acquired image to be displayed on the application screen used for the video meeting (see FIG. 5).

Example 6

Figure 11:
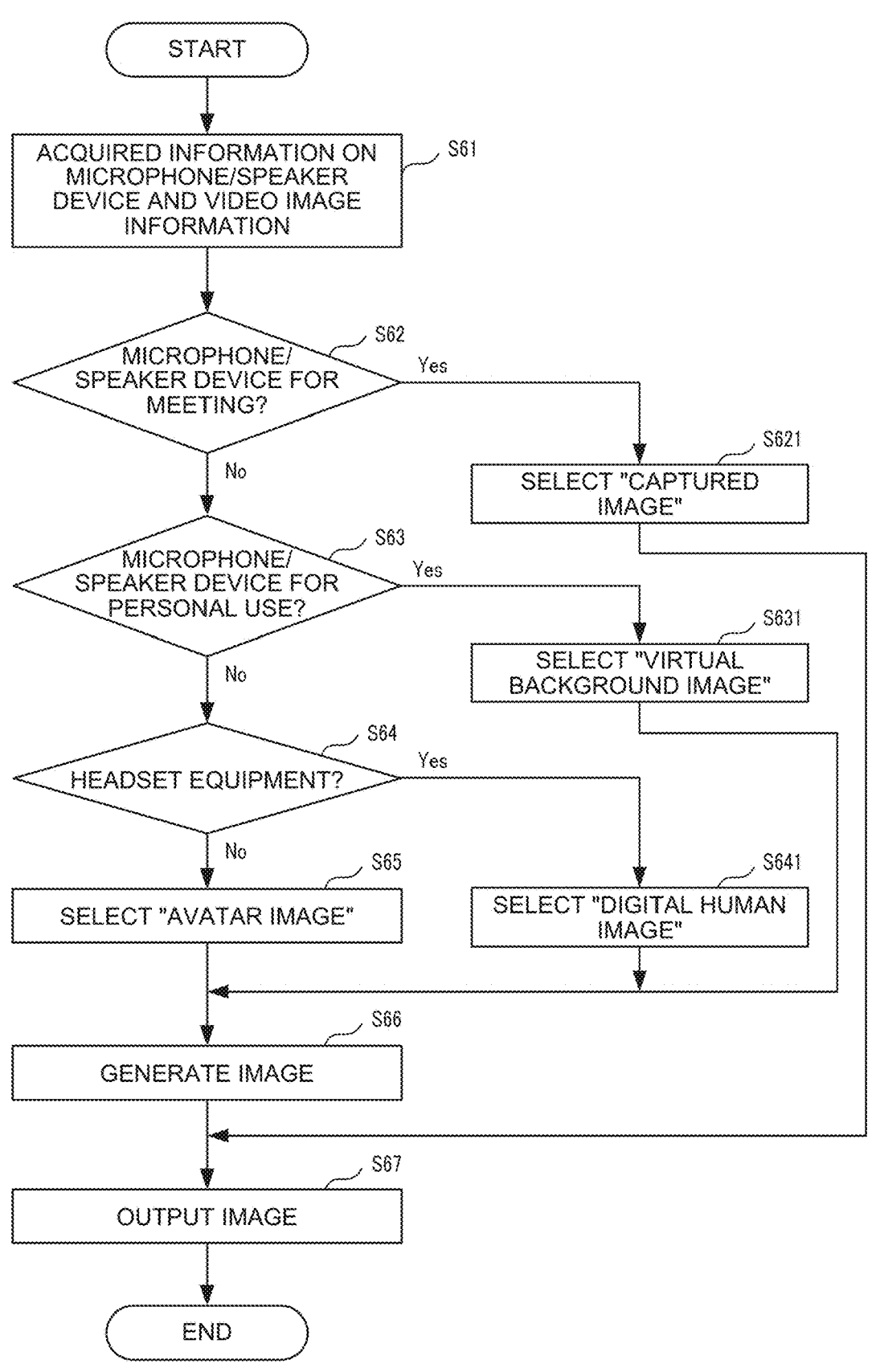
FIG. 11 is a flowchart for explaining an example of a procedure of display control processing of an example 6 that is executed in the meeting system according to an embodiment of the disclosure.

FIG. 11 is a flowchart corresponding to the display control process according to Example 6.

In step S61, the controller 11 acquires information on the microphone-speaker device connected to the user terminal 1A. When the user A performs the login operation, the controller 11 acquires the video image information (e.g., captured images) from the camera device 2A.

In step S62, the controller 11 determines whether or not the microphone-speaker device is for a meeting room. If the microphone-speaker device is for a meeting room (S62:Yes), the controller 11 causes the process to proceed to step S621. If the microphone-speaker device is not for a meeting room (S62: No), the controller 11 causes the process to proceed to step S63.

In step S621, the controller 11 determines that the type of the image to be displayed on the user terminal 1B is a "captured image." After Step S621, the controller 11 causes the process to proceed to step S67.

In step S63, the controller 11 determines whether or not the microphone-speaker device is for personal use. If the microphone-speaker device is for personal use (S63:Yes), the controller 11 causes the process to proceed to step S631. If the microphone-speaker device is not for personal use (S63: No), the controller 11 causes the process to proceed to step S64.

In step S631, the controller 11 determines that the type of the image to be displayed on the user terminal 1B is a "virtual background image." After Step S631, the controller 11 causes the process to proceed to step S66.

In step S64, the controller 11 determines whether or not the microphone-speaker device is a headset device. If the microphone-speaker device is a headset device (S64:Yes), the controller 11 causes the process to proceed to step S641.

If the microphone-speaker device is not a headset device (S64:No), the controller 11 causes the process to proceed to step S65.

In step S641, the controller 11 determines that the type of the image to be displayed on the user terminal 1B is a "digital human image." After Step S641, the controller 11 causes the process to proceed to step S66.

In step S65, the controller 11 determines that the type of the image to be displayed on the user terminal 1B is an "avatar image." After Step S65, the controller 11 causes the process to proceed to step S66.

In step S66, the controller 11 generates an image of the determined type. Here, the controller 11 generates a virtual background image, a digital human image, or an avatar image based on the captured image. After Step S66, the controller 11 causes the process to proceed to step S67.

In step S67, the controller 11 outputs the image of the determined type to the user terminal 1B. Here, the controller 11 outputs a captured image, an avatar image, a virtual background image, or a digital human image to the user terminal 1B. Upon acquiring the image from user terminal 1A, the user terminal 1B causes the acquired image to be displayed on the meeting application screen (see FIG. 5).

Example 7

Figure 12:
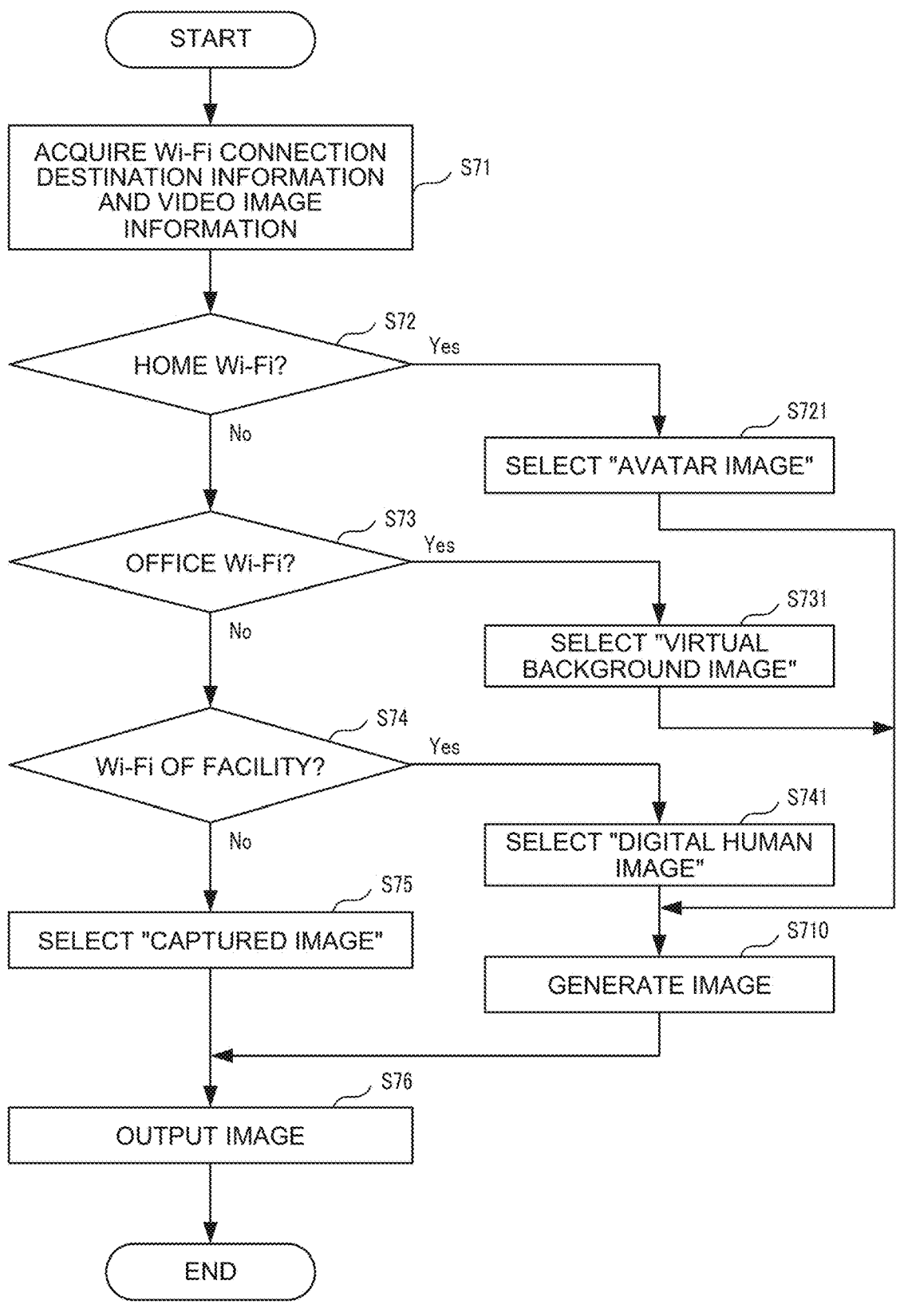
FIG. 12 is a flowchart for explaining an example of a procedure of display control processing of an example 7 that is executed in the meeting system according to an embodiment of the disclosure.

FIG. 12 is a flowchart corresponding to the display control process according to Example 7.

In step S71, the controller 11 acquires Wi-Fi connection destination information and video image information. Specifically, when the user A performs the login operation, the controller 11 acquires information on the Wi-Fi connection destination (home, in-house, facility, etc.). When the user A performs the login operation, the controller 11 acquires the video image information (e.g., captured images) from the camera device 2A.

In step S72, the controller 11 determines whether or not the Wi-Fi connection destination is one's home. If the Wi-Fi connection destination is one's home (S72:Yes), the controller 11 causes the process to proceed to step S721. If the Wi-Fi connection destination is not one's home (S72:No), the controller 11 causes the process to proceed to step S73.

In step S721, the controller 11 determines that the type of the image to be displayed on the user terminal 1B is an "avatar image." After Step S721, the controller 11 causes the process to proceed to step S710.

In step S73, the controller 11 determines whether or not the Wi-Fi connection destination is in-house. If the Wi-Fi connection destination is in-house (S73:Yes), the controller 11 causes the process to proceed to step S731. If the Wi-Fi connection destination is not in-house (S73:No), the controller 11 causes the process to proceed to step S74.

In step S731, the controller 11 determines that the type of the image to be displayed on the user terminal 1B is a "virtual background image." After Step S731, the controller 11 causes the process to proceed to step S710.

In step S74, the controller 11 determines whether or not the Wi-Fi connection destination is a facility (hotel, cafe, etc.). If the Wi-Fi connection destination is a facility (S74: Yes), the controller 11 causes the process to proceed to step S741. If the Wi-Fi connection destination is not a facility (S74: No), the controller 11 proceeds to step S75.

In step S741, the controller 11 determines that the type of the image to be displayed on the user terminal 1B is a "digital human image." After Step S741, the controller 11 causes the process to proceed to step S710.

In step S75, the controller 11 determines that the type of the image to be displayed on the user terminal 1B is a "captured image." After Step S75, the controller 11 causes the process to proceed to step S76.

In step S710, the controller 11 generates an image of the determined type. Here, the controller 11 generates an avatar image, a virtual background image, or a digital human image based on the captured image. After Step S710, the controller 11 causes the process to proceed to step S76.

In step S76, the controller 11 outputs the image of the determined type to the user terminal 1B. Here, the controller 11 outputs a captured image, an avatar image, a virtual background image, or a digital human image to the user terminal 1B. Upon acquiring the image from user terminal 1A, the user terminal 1B causes the acquired image to be displayed on the application screen used for the video meeting (see FIG. 5).

Example 8

Figure 13:
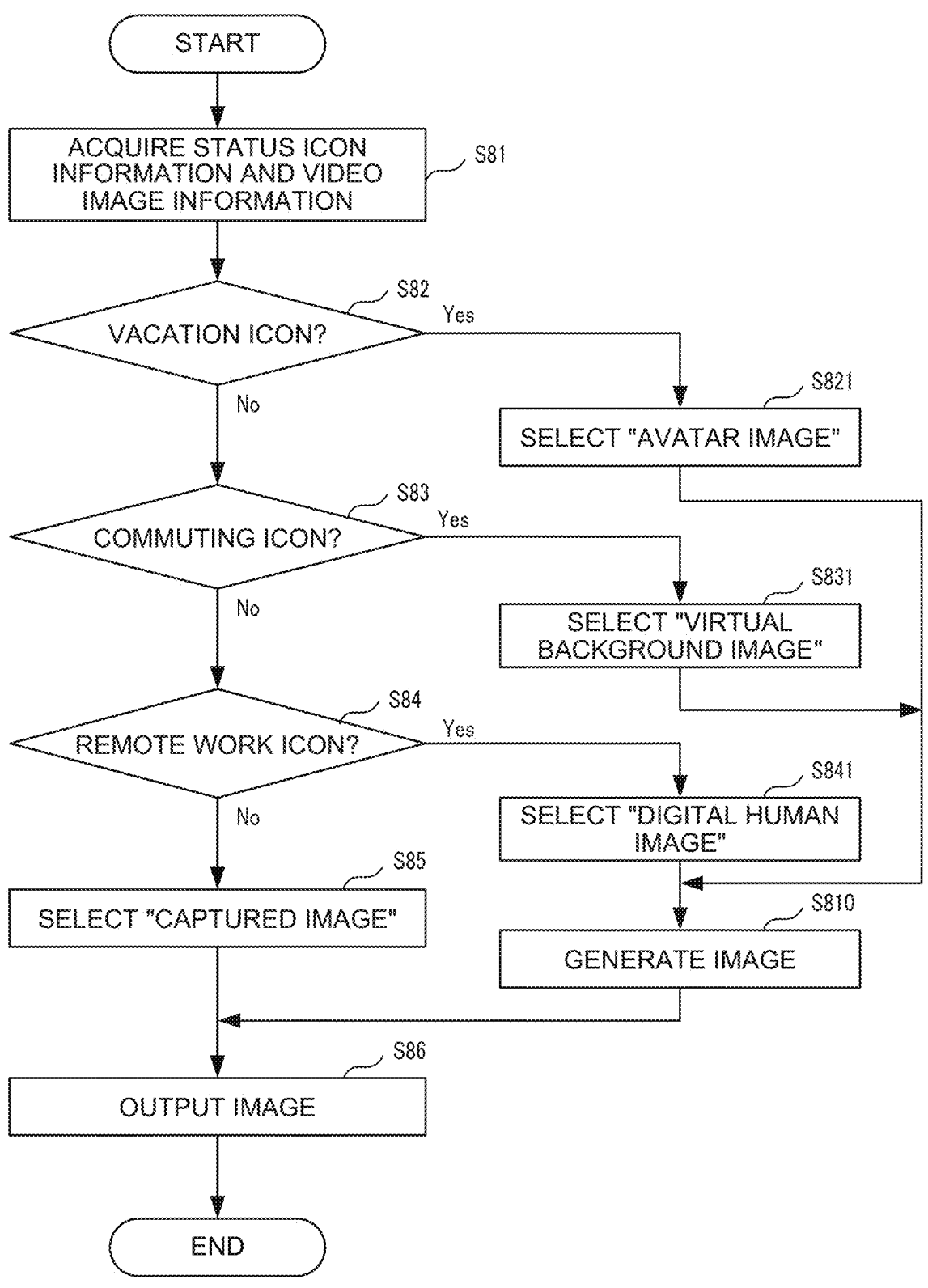
FIG. 13 is a flowchart for explaining an example of a procedure of display control processing of an example 8 that is executed in the meeting system according to an embodiment of the disclosure.

FIG. 13 is a flowchart corresponding to the display control process according to Example 8.

In step S81, the controller 11 acquires status icon information and video image information. Specifically, when the user A performs the login operation, the controller 11 acquires information on an icon image Sc representing the status (see FIG. 5). When the user A performs the login operation, the controller 11 acquires the video image information (e.g., captured images) from the camera device 2A.

In step S82, the controller 11 determines whether or not the status icon indicates that the user is on vacation. If the status icon indicates that the user is on vacation (S82:Yes), the controller 11 causes the process to proceed to step S821. If the status icon does not indicate that the user is on vacation (S82:No), the controller 11 causes the process to proceed to step S83.

In step S821, the controller 11 determines that the type of the image to be displayed on the user terminal 1B is an "avatar image." After Step S821, the controller 11 causes the process to proceed to step S810.

In step S83, the controller 11 determines whether or not the status icon indicates that the user is commuting. If the status icon indicates that the user is commuting (S83:Yes), the controller 11 causes the process to proceed to step S831. If the status icon does not indicate that the user is commuting (S83:No), the controller 11 causes the process to proceed to step S84.

In step S831, the controller 11 determines that the type of the image to be displayed on the user terminal 1B is a "virtual background image." After Step S831, the controller 11 causes the process to proceed to step S810.

In step S84, the controller 11 determines whether or not the status icon indicates that the user is working remotely. If the status icon indicates that the user is working remotely (S84:Yes), the controller 11 causes the process to proceed to step S841. If the status icon does not indicate that the user is working remotely (S84:No), the controller 11 causes the process to proceed to step S85.

In step S841, the controller 11 determines that the type of the image to be displayed on the user terminal 1B is a "digital human image." After Step S841, the controller 11 causes the process to proceed to step S810.

In step S85, the controller 11 determines that the type of the image to be displayed on the user terminal 1B is a "captured image." After Step S85, the controller 11 causes the process to proceed to step S86.

In step S810, the controller 11 generates an image of the determined type. Here, the controller 11 generates an avatar image, a virtual background image, or a digital human image based on the captured image. After Step S810, the controller 11 causes the process to proceed to step S86.

In step S86, the controller 11 outputs the image of the determined type to the user terminal 1B. Here, the controller 11 outputs a captured image, an avatar image, a virtual background image, or a digital human image to the user terminal 1B. Upon acquiring the image from user terminal 1A, the user terminal 1B causes the acquired image to be displayed on the application screen used for the video meeting (see FIG. 5).

Example 9

Figure 14:
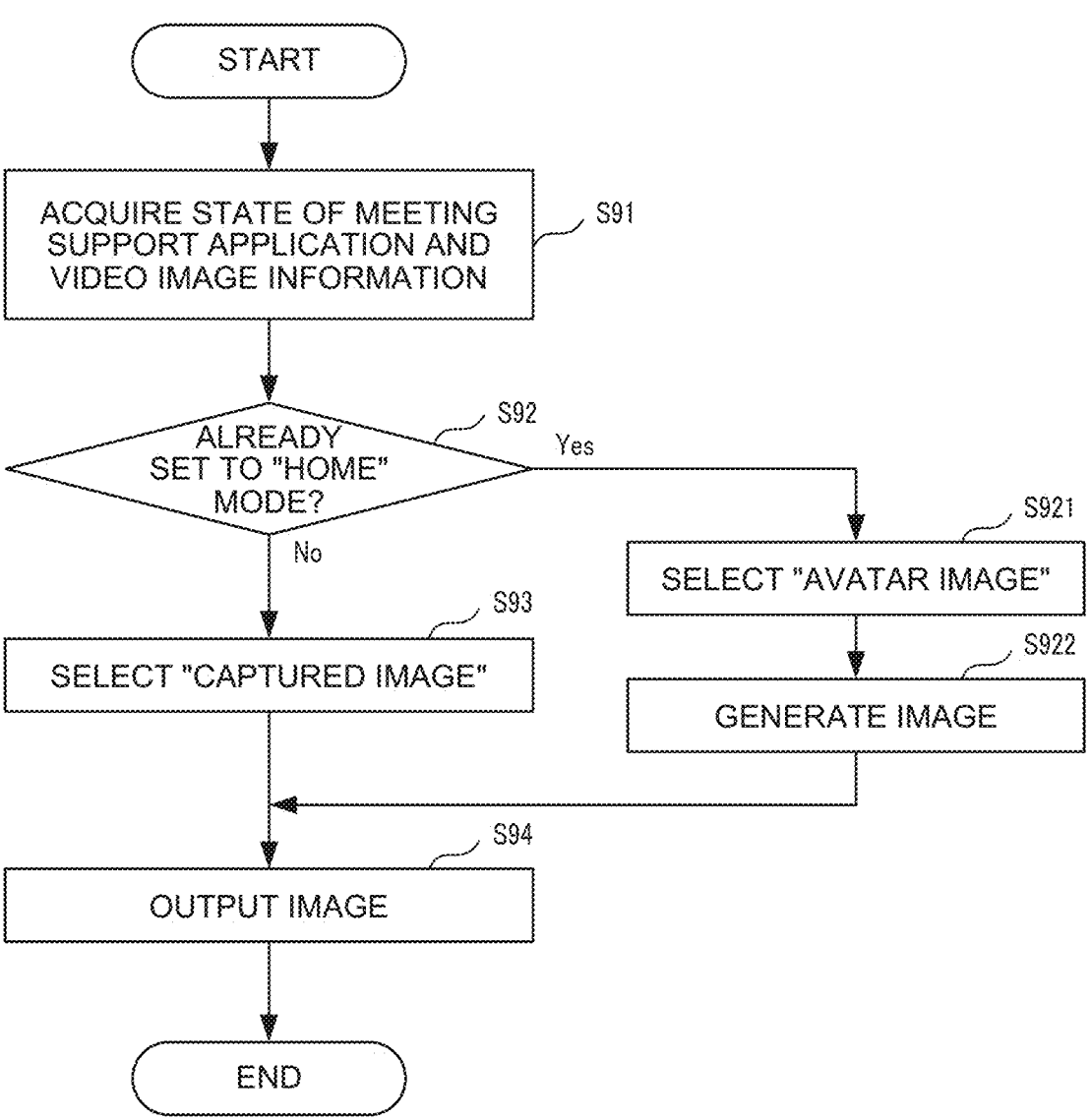
FIG. 14 is a flowchart for explaining an example of a procedure of display control processing of an example 9 that is executed in the meeting system according to an embodiment of the disclosure.

FIG. 14 is a flowchart corresponding to the display control process according to Example 9.

In step S91, the controller 11 acquires the status of the meeting support application and video image information. When the user A performs the login operation, the controller 11 acquires the video image information (e.g., captured images) from the camera device 2A.

Here, the meeting support application is an application that supports video meeting executed by a general-purpose meeting application. The meeting support application manages the progress of the meeting and accepts user operations. In the meeting support application, the user can set the operation mode to a home mode or an office mode. For example, the user can set the home mode for private meetings and the office mode for work-related meetings.

In step S92, the controller 11 determines whether or not the operation mode is set to the home mode. If the operation mode is set to the home mode (S92:Yes), the controller 11 causes the process to proceed to step S921. If the operation mode is set to the office mode (S92:No), the controller 11 causes the process to proceed to step S93.

In step S921, the controller 11 determines that the type of the image to be displayed on the user terminal 1B is an "avatar image." After Step S921, the controller 11 causes the process to proceed to step S922.

In step S922, the controller 11 generates an image of the determined type. Here, the controller 11 generates an avatar image based on the captured image. After Step S922, the controller 11 causes the process to proceed to step S94.

In step S93, the controller 11 determines that the type of the image to be displayed on the user terminal 1B is a "captured image." After Step S93, the controller 11 causes the process to proceed to step S94.

In step S94, the controller 11 outputs the image of the determined type to the user terminal 1B. Here, the controller 11 outputs a captured image or an avatar image to the user terminal 1B. Upon acquiring the image from user terminal 1A, the user terminal 1B causes the acquired image to be displayed on the application screen used for the video meeting (see FIG. 5).

Example 10

FIG. 15 is a flowchart corresponding to the display control process according to Example 10.

In step S101, the controller 11 acquires NFC communication history and video image information. Specifically, the user A taps the NFC at the start of the meeting. When the user A taps the NFC, the communication history is stored in the storage 12. When the user A performs the login operation, the controller 11 acquires the video image information (e.g., captured images) from the camera device 2A.

In Step S102, the controller 11 determines whether or not the NFC has been tapped immediately before the start of the meeting. If the NFC has been tapped immediately before the start of the meeting (S102:Yes), the controller 11 causes the process to proceed to step S106. If the NFC has not been tapped immediately before the start of the meeting (S102: No), the controller 11 causes the process to proceed to step S103.

In step S106, the controller 11 determines that the type of the image to be displayed on the user terminal 1B is a "captured image." After Step S106, the controller 11 causes the process to proceed to step S105.

In step S103, the controller 11 determines that the type of the image to be displayed on the user terminal 1B is an "avatar image." After Step S103, the controller 11 causes the process to proceed to step S104.

In step S104, the controller 11 generates an image of the determined type. Here, the controller 11 generates an avatar image based on the captured image. After Step S104, the controller 11 causes the process to proceed to step S105.

In step S105, the controller 11 outputs the image of the determined type to the user terminal 1B. Here, the controller 11 outputs a captured image or an avatar image to the user terminal 1B. Upon acquiring the image from user terminal 1A, the user terminal 1B causes the acquired image to be displayed on the application screen used for the video meeting (see FIG. 5).

Example 11

Figure 16:
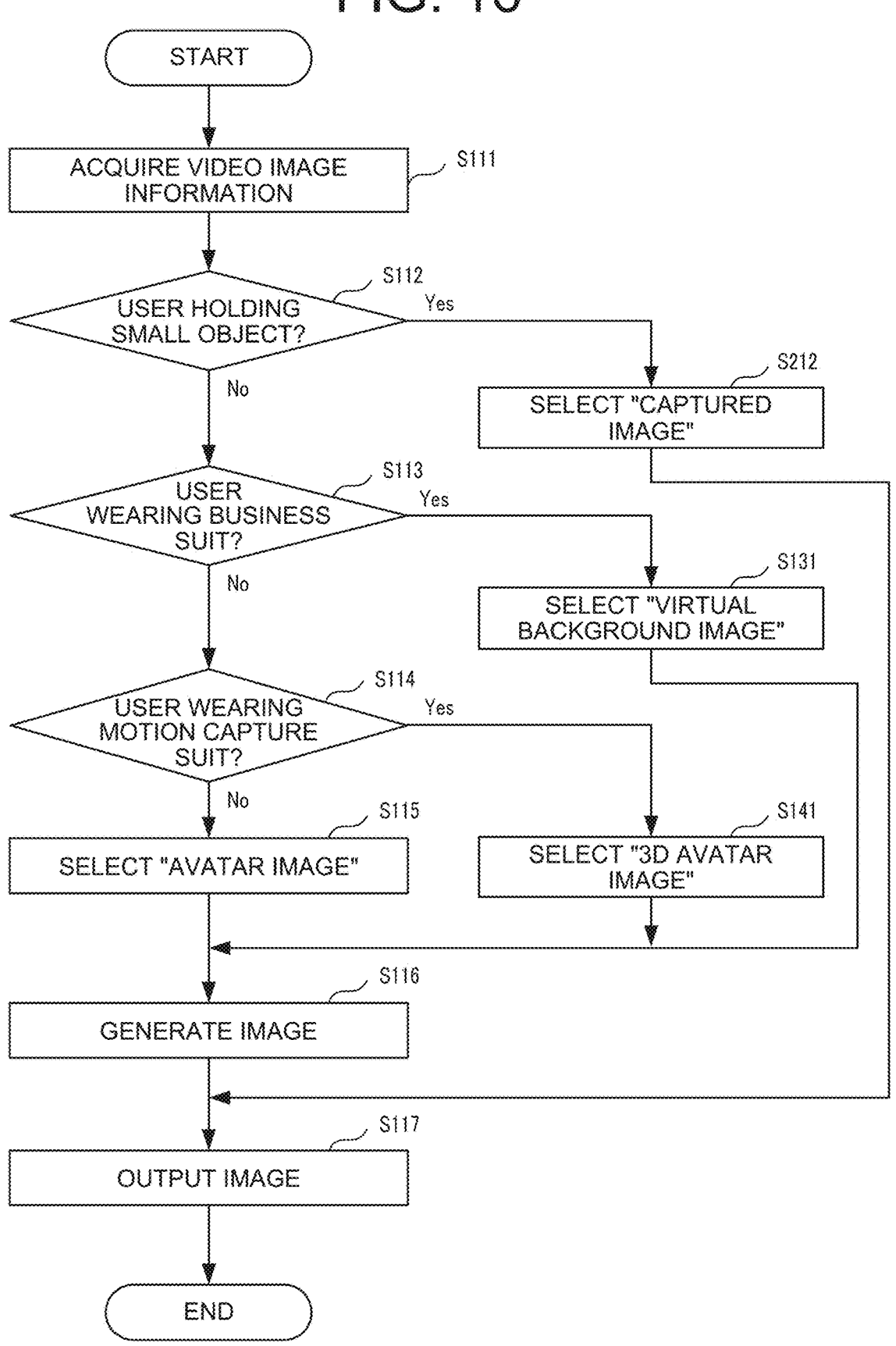
FIG. 16 is a flowchart for explaining an example of a procedure of display control processing of an example 11 that is executed in the meeting system according to an embodiment of the disclosure.

FIG. 16 is a flowchart corresponding to the display control process according to Example 11.

In step S111, if the user A performs the login operation, the controller 11 acquires the video image information (e.g., captured images) from the camera device 2A.

In step S112, the controller 11 determines whether or not the user A in the captured image is holding a small object. If the user A in the captured image is holding a small object (S112:Yes), the controller 11 causes the process to proceed to step S212. If the user A in the captured image is not holding a small object (S112:No), the controller 11 causes the process to proceed to step S113.

In step S212, the controller 11 determines that the type of the image to be displayed on the user terminal 1B is a "captured image." After Step S212, the controller 11 causes the process to proceed to step S117.

In step S113, the controller 11 determines whether or not the user A in the captured image is wearing a business suit. If the user A in the captured image is wearing a business suit (S113:Yes), the controller 11 causes the process to proceed to step S131. If the user A in the captured image is not wearing a business suit (S113:No), the controller 11 causes the process to proceed to step S114.

In step S131, the controller 11 determines that the type of the image to be displayed on the user terminal 1B is a "virtual background image." After Step S131, the controller 11 causes the process to proceed to step S116.

In step S114, the controller 11 determines whether or not the user A in the captured image is wearing a motion capture suit. If the user A in the captured image is wearing a motion capture suit (S114:Yes), the controller 11 causes the process to proceed to step S141. If the user A in the captured image is not wearing a motion capture suit (S114:No), the controller 11 causes the process to proceed to step S115.

In step S141, the controller 11 determines that the type of the image to be displayed on the user terminal 1B is a "3D avatar image." After Step S141, the controller 11 causes the process to proceed to step S116.

In step S115, the controller 11 determines that the type of the image to be displayed on the user terminal 1B is an "avatar image." After Step S115, the controller 11 causes the process to proceed to step S116.

In step S116, the controller 11 generates an image of the determined type. Here, the controller 11 generates a virtual background image, a 3D avatar image, or an avatar image based on the captured image. After Step S116, the controller 11 causes the process to proceed to step S117.

In step S117, the controller 11 outputs the image of the determined type to the user terminal 1B. Here, the controller 11 outputs a captured image, a virtual background image, a 3D avatar image, or an avatar image to the user terminal 1B. Upon acquiring the image from user terminal 1A, the user terminal 1B causes the acquired image to be displayed on the meeting application screen (see FIG. 5).

Example 12

Figure 17:
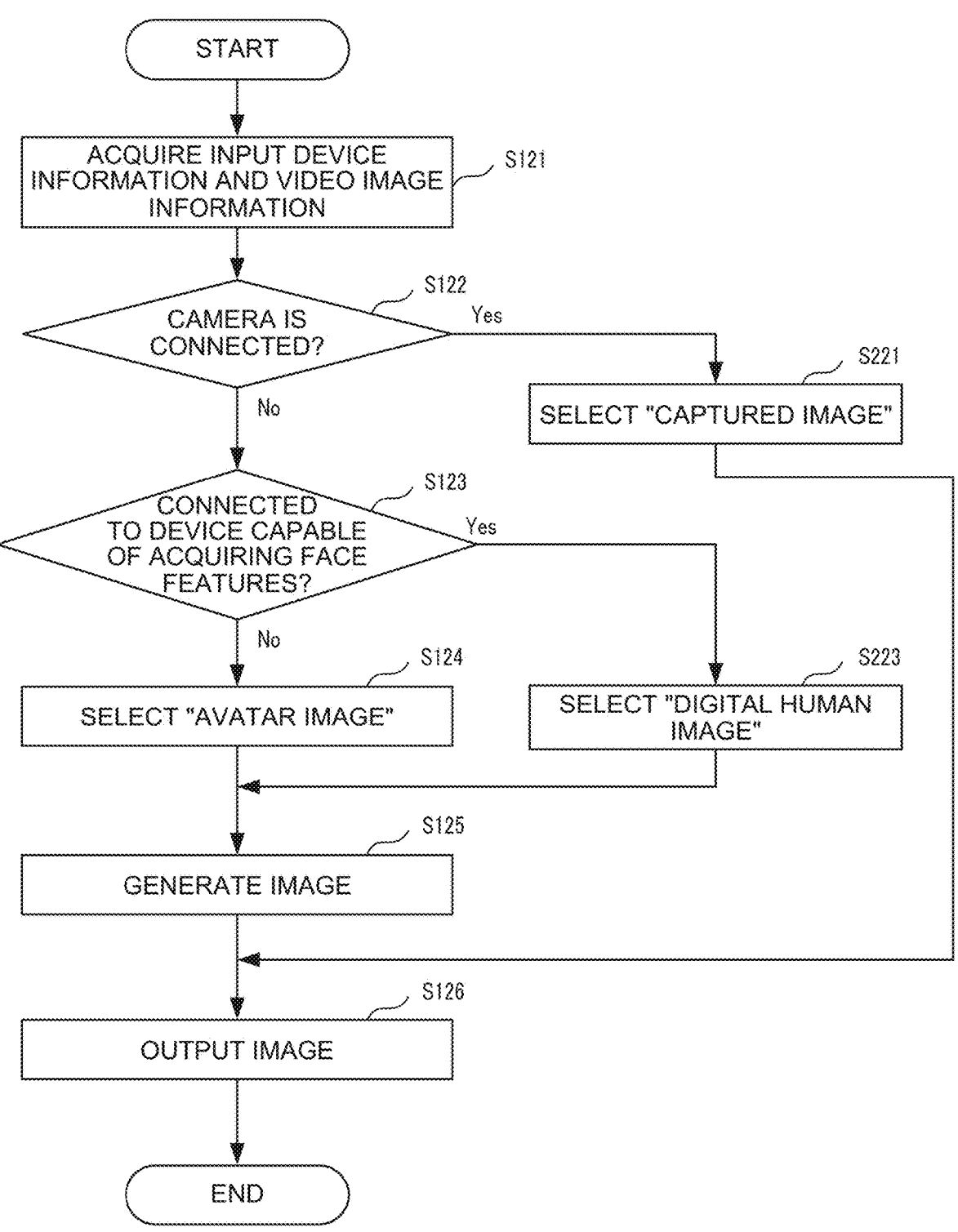
FIG. 17 is a flowchart for explaining an example of a procedure of display control processing of an example 12 that is executed in the meeting system according to an embodiment of the disclosure.

FIG. 17 is a flowchart corresponding to the display control process according to Example 12.

In step S121, the controller 11 acquires information on an input device connected to the user terminal 1A. When the user A performs the login operation, the controller 11 acquires the video image information (e.g., captured images) from the camera device 2A. The input devices include, for example, a camera device 2.

In step S122, the controller 11 determines whether or not a camera device 2 is connected. If a camera device 2 is connected (S122:Yes), the controller 11 proceeds to step S221. If a camera device 2 is not connected (S122:No), the controller 11 proceeds to step S123.

In step S221, the controller 11 determines that the type of the image to be displayed on the user terminal 1B is a "captured image." After Step S221, the controller 11 causes the process to proceed to step S126.

In step S123, the controller 11 determines whether or not a device (camera device 2) capable of acquiring facial feature values of the user A is connected. The device is, for example, a smartphone. If a device capable of acquiring facial feature values of the user A is connected (S123:Yes), the controller 11 proceeds to step S223. If a device (camera device 2) capable of acquiring facial feature values of the user A is not connected (S123:No), the controller 11 proceeds to step S124.

In step S223, the controller 11 determines that the type of the image to be displayed on the user terminal 1B is a "digital human image." After Step S223, the controller 11 causes the process to proceed to step S125.

In step S124, the controller 11 determines that the type of the image to be displayed on the user terminal 1B is an "avatar image." After Step S124, the controller 11 causes the process to proceed to step S125.

In step S125, the controller 11 generates an image of the determined type. Here, the controller 11 acquires the feature value data from the camera device 2 and generates a digital human image based on the feature value data. Here, the controller 11 generates an avatar image based on the captured image. After Step S125, the controller 11 causes the process to proceed to step S126.

In step S126, the controller 11 outputs the image of the determined type to the user terminal 1B. Here, the controller 11 outputs a captured image, a digital human image, or an avatar image to the user terminal 1B. Upon acquiring the image from user terminal 1A, the user terminal 1B causes the acquired image to be displayed on the meeting application screen (see FIG. 5).

As described above, the controller 11 determines the type of the image to be displayed on the meeting terminal (user terminal 1) on the basis of predetermined conditions (for example, conditions 1 to 5 in FIG. 4) and outputs an image (captured image, processed image, etc.) corresponding to the determined type of image to the meeting terminal. Each of the conditions is a condition corresponding to each of the determination processes included in Examples 1 to 12.

According to the above configuration, for example, user-captured images (real video images) can be displayed in meetings where it is not appropriate to use character images, and processed images such as character images can be displayed in private meetings. Thus, it is possible to appropriately switch the image displayed on the meeting terminal in accordance with the content of the meeting.

The disclosure is not limited to the above-described embodiments. As another embodiment, the meeting system 100 may include a server connected to each user terminal 1 via a network N1. The server may comprise, for example, a cloud server. The server may have the functions of the controller 11 of the user terminal 1 described above. Specifically, the server acquires the meeting information D1 related to a meeting, acquires video image information corresponding to the video images of the users participating in the meeting, determines the type of image to be displayed on the meeting terminal on the basis of the acquired meeting information, and outputs an image corresponding to the acquired video image information and the determined image type to the meeting terminal. That is, the server may include processors (see FIG. 2) such as a meeting acquisition processor 111, a video image acquisition processor 112, a determination processor 113, a generation processor 114, and an output processor 115.

The server may also store the meeting information D1 (see FIG. 3) and the image type information D2 (see FIG. 4).

The server may also store a meeting application. In such a case, each user terminal 1 accesses the server and executes a browser process to run the meeting application.

As described above, the display control system of the disclosure may include a single user terminal 1, a single server, or a combination of a user terminal 1 and the server.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display control system that causes an image to be displayed on a meeting terminal during a meeting in which a user participates, the image corresponding to the user, the system comprising:

a meeting acquisition circuit that acquires meeting information including at least one of a meeting time of the meeting, participants of the meeting, content of the meeting, importance of the meeting, and location of users participating in the meeting;

a video image acquisition circuit that acquires video image information corresponding to a video image capturing the user participating in the meeting;

a determination circuit that determines a captured image or a processed image as the image to be displayed on the meeting terminal based on the meeting information acquired by the meeting acquisition circuit and an object, held by the user, included in the video image information acquired by the video image acquisition circuit, the captured image being the video image of the user captured with a camera, and the processed image being an image obtained by processing the video image of the user captured with the camera; and an output circuit that outputs the captured image or the processed image, determined by the determination circuit, to the meeting terminal, wherein the output circuit:

causes the captured image to be displayed on the meeting terminal when the video image information indicates that the user is holding the object, and causes the processed image of a type corresponding to clothes of the user to be displayed on the meeting terminal when the video image information indicates that the user is not holding the object.

2. The display control system according to claim 1, wherein the processed image includes at least one of a character image, an illustration image, a digital human image, and a virtual background image.

3. The display control system according to claim 2, further comprising:

a generation circuit that generates the processed image in accordance with the image determined by the determination circuit based on the video image information acquired by the video image acquisition circuit.

4. The display control system according to claim 1, wherein the video image acquisition circuit further acquires the captured image or feature value data, the feature value data being extracted from the video image of the user captured by the camera.

5. A display control method of causing an image to be displayed on a meeting terminal during a meeting in which a user participates, the image corresponding to the user, the method comprising:

acquiring meeting information including at least one of a meeting time of the meeting, participants of the meeting, content of the meeting, importance of the meeting, and location of users participating in the meeting;

acquiring video image information corresponding to a video image capturing the user participating in the meeting;

determining a captured image or a processed image as the image to be displayed on the meeting terminal based on the meeting information and an object, held by the user, included in the video image information, the captured image being the video image of the user captured with a camera, and the processed image being an image obtained by processing the video image of the user captured with the camera; and outputting the captured image or the processed image to the meeting terminal, wherein in outputting the captured image or the processed image to the meeting terminal, the method further comprises:

causing the captured image to be displayed on the meeting terminal when the video image information indicates that the user is holding the object; and causing the processed image of a type corresponding to clothes of the user to be displayed on the meeting terminal when the video image information indicates that the user is not holding the object.

6. A non-transitory computer-readable recording medium containing a display control program that causes an image to be displayed on a meeting terminal during a meeting in which a user participates, the image corresponding to the user, the display control program causing at least one processor to execute:

acquisition of meeting information including at least one of a meeting time of the meeting, participants of the meeting, content of the meeting, importance of the meeting, and location of users participating in the meeting;

acquisition of video image information corresponding to a video image capturing the user participating in the meeting;

determination of a captured image or a processed image as the image to be displayed on the meeting terminal based on the meeting information and an object, held by the user, included in the video image information, the captured image being the video image of the user captured with a camera, and the processed image being an image obtained by processing the video image of the user captured with the camera; and output of the captured image or the processed image to the meeting terminal, wherein in the output of the captured image or the processed image to the meeting terminal, the display control program further causes the at least one processor to:

cause the captured image to be displayed on the meeting terminal when the video image information indicates that the user is holding the object, and cause the processed image of a type corresponding to clothes of the user to be displayed on the meeting terminal when the video image information indicates that the user is not holding the object.

* * * * *